(12) United States Patent
Steeman et al.

(10) Patent No.: US 10,384,408 B2
(45) Date of Patent: Aug. 20, 2019

(54) PROCESS FOR MAKING A POLYMERIC FILM

(75) Inventors: Reinard Jozef Maria Steeman, Echt (NL); Marcel Jongedijk, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1163 days.

(21) Appl. No.: 14/131,104

(22) PCT Filed: Jun. 29, 2012

(86) PCT No.: PCT/EP2012/062769
§ 371 (c)(1),
(2), (4) Date: Mar. 28, 2014

(87) PCT Pub. No.: WO2013/004640
PCT Pub. Date: Jan. 10, 2013

(65) Prior Publication Data
US 2014/0205826 A1 Jul. 24, 2014

(30) Foreign Application Priority Data
Jul. 7, 2011 (EP) .................................... 11173050

(51) Int. Cl.
*B29C 43/00* (2006.01)
*B29C 43/22* (2006.01)
(Continued)

(52) U.S. Cl.
CPC .............. *B29D 7/01* (2013.01); *B29C 43/003* (2013.01); *C08J 5/18* (2013.01); *D03D 1/0052* (2013.01);
(Continued)

(58) Field of Classification Search
CPC ........ B29D 7/01; D03D 3/005; D03D 1/0052; C08J 5/18; C08J 2323/06; Y10T 442/3041; Y10T 428/269; B29C 43/003; B29C 43/006; B29C 43/228; B29C 43/24; B29C 43/245; B29C 43/26; B29C 43/44; B29C 43/46; B29C 2043/466; B29C 43/48;
(Continued)

(56) References Cited

U.S. PATENT DOCUMENTS 2,965,920 A 12/1960 Whittum
3,398,564 A * 8/1968 Barten .................... B21B 29/00
72/241.4
(Continued)

FOREIGN PATENT DOCUMENTS

DE 1729821 3/1972
EP 1 627 719 2/2006
(Continued)

OTHER PUBLICATIONS

International Search Report for PCT/EP2012/062769, dated Nov. 9, 2012.
(Continued)

*Primary Examiner* — Jeffrey M Wollschlager
(74) *Attorney, Agent, or Firm* — Nixon & Vanderhye P.C.

(57) ABSTRACT

The invention relates to a process to make films and tapes from ultrahigh molecular weight polyethylene (UHMWPE) in the solid state. The films and tapes according to the invention have an improved thickness whereby the coefficient of variation of the thickness of the film of at most 6%.

8 Claims, 1 Drawing Sheet

(51) Int. Cl.
  *B29C 43/24* (2006.01)
  *B29C 43/26* (2006.01)
  *B29C 43/46* (2006.01)
  *B29C 43/48* (2006.01)
  *B29C 43/58* (2006.01)
  *B29K 23/00* (2006.01)
  *B29D 7/01* (2006.01)
  *C08J 5/18* (2006.01)
  *D03D 1/00* (2006.01)
  *D03D 3/00* (2006.01)

(52) U.S. Cl.
  CPC ............ *D03D 3/005* (2013.01); *B29C 43/006* (2013.01); *B29C 43/228* (2013.01); *B29C 43/24* (2013.01); *B29C 43/245* (2013.01); *B29C 43/26* (2013.01); *B29C 43/48* (2013.01); *B29C 2043/466* (2013.01); *B29C 2043/483* (2013.01); *B29C 2043/486* (2013.01); *B29C 2043/5825* (2013.01); *B29K 2023/0675* (2013.01); *B29K 2023/0683* (2013.01); *C08J 2323/06* (2013.01); *Y10T 428/269* (2015.01); *Y10T 442/3041* (2015.04)

(58) Field of Classification Search
  CPC ........ B29C 2043/483; B29C 2043/486; B29C 2043/5825; B29K 2023/0675; B29K 2023/0683
  See application file for complete search history.

(56) References Cited

U.S. PATENT DOCUMENTS

| | | | | |
|---|---|---|---|---|
| 3,852,860 | A * | 12/1974 | Tewes | F16C 13/024 492/42 |
| 3,993,424 | A | 11/1976 | Pawelczyk et al. | |
| 4,186,579 | A * | 2/1980 | Eibe | B21B 38/02 72/13.4 |
| 4,364,158 | A | 12/1982 | Bainton | |
| 4,571,096 | A * | 2/1986 | Swasey | B21B 31/07 384/266 |
| 4,651,552 | A | 3/1987 | Ahrweiler | |
| 4,699,050 | A | 10/1987 | Heise | |
| 4,879,076 | A | 11/1989 | Sano et al. | |
| 4,903,517 | A * | 2/1990 | Van Haag | B21B 37/36 100/162 B |
| 5,048,411 | A * | 9/1991 | Siebert | B30B 3/04 100/168 |
| 5,091,133 | A | 2/1992 | Kobayashi et al. | |
| 5,106,555 | A | 4/1992 | Kobayashi et al. | |
| 5,106,558 | A | 4/1992 | Kobayashi et al. | |
| 5,141,681 | A | 8/1992 | Ramm | |
| 5,200,129 | A | 4/1993 | Kobayashi et al. | |
| 5,236,640 | A | 8/1993 | Heiderich et al. | |
| 5,578,373 | A | 11/1996 | Kobayashi et al. | |
| 5,743,177 | A * | 4/1998 | Wostbrock | D21F 7/06 100/163 A |
| 7,993,715 | B2 * | 8/2011 | Geva | B32B 5/12 2/2.5 |
| 2006/0142521 | A1 | 6/2006 | Rastogi et al. | |
| 2008/0251960 | A1* | 10/2008 | Harding | B29C 43/228 264/119 |
| 2008/0318016 | A1* | 12/2008 | Weedon | B29C 43/22 428/219 |
| 2011/0095447 | A1* | 4/2011 | Peters | B29C 43/003 264/119 |

FOREIGN PATENT DOCUMENTS

| | | |
|---|---|---|
| WO | WO 01/21668 | 3/2001 |
| WO | WO 2010/007062 | 1/2010 |

OTHER PUBLICATIONS

Hensen, *Plastic Extrusion Technology*, pp. 210-211, Hanser-Verlag 1986.

* cited by examiner

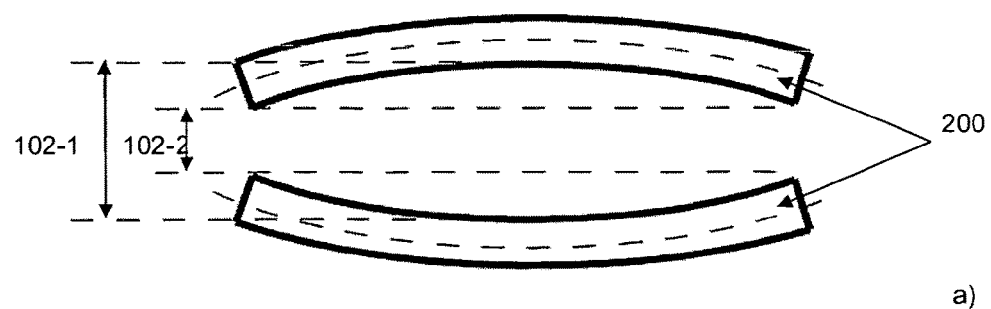
a)
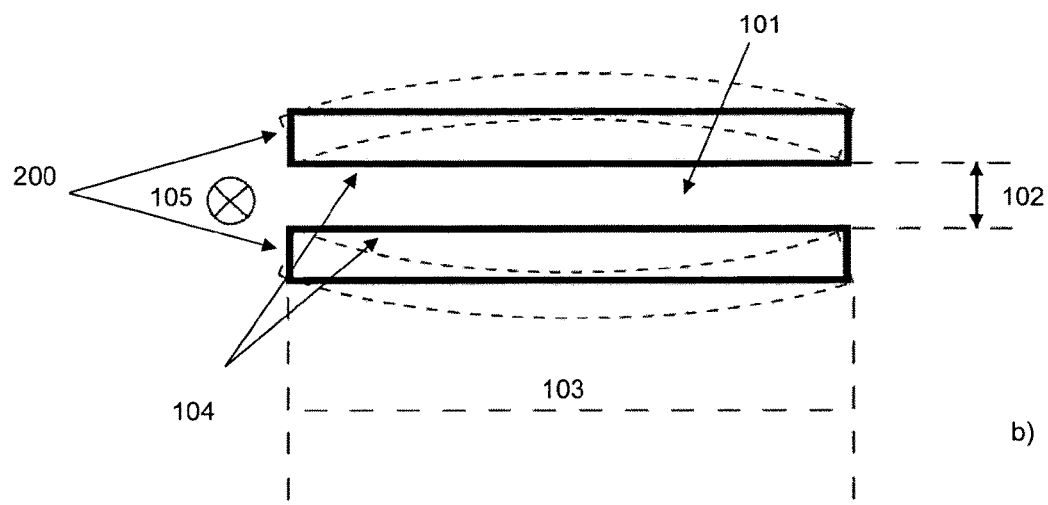
b)
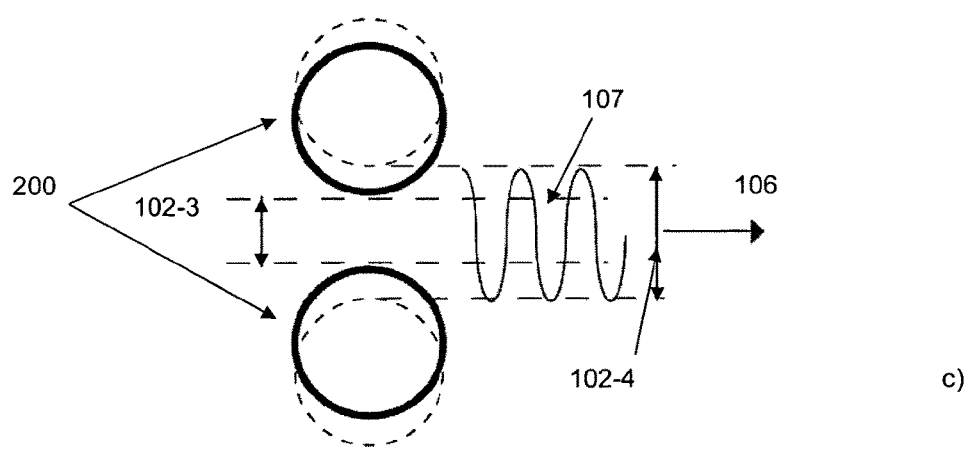
c)

PROCESS FOR MAKING A POLYMERIC FILM

This application is the U.S. national phase of International Application No. PCT/EP2012/062769, filed 29 Jun. 2012, which designated the U.S. and claims priority to EP Application No 11173050.3, filed 7 Jul. 2011, the entire contents of each of which are hereby incorporated by reference.

The present invention relation to a process for making a polymeric film, comprising in sequence the steps of (a) providing a bed of a polymeric powder having a melting temperature; (b) applying a compression pressure on said bed at a compression temperature lower than the melting temperature of the polymeric powder to obtain a compressed bed; and (c) compacting said compressed bed into a polymeric film. The invention further relates to a polymeric film and various uses of said polymeric film.

A similar process for making polymeric films is known for example from EP 1 627 719. According to this document, an ultrahigh molecular weight polyethylene (UHMWPE) film is prepared by compressing a particulate UHMWPE powder bed at a temperature lower than the melting temperature thereof and then further compacting the compressed bed by calendaring it. The UHMWPE film may be further processed by drawing it. The obtained unidirectionally oriented UHMWPE film exhibits a high tensile strength at the direction of drawing. Further known processes for making polymeric films are disclosed for example in U.S. Pat. Nos. 4,879,076; 5,091,133; 5,106,555; 5,106,558; 5,200,129; 5,578,373 and WO 2010/007062. Since the step of compressing a polymeric powder bed is common to all these processes, such processes are commonly known and referred to in the art as solid-state processes. Moreover in all instances, a calendar is used for compacting the compressed powder, i.e. said compressed powder is compacted between a pair of counter-rotating rolls that provide a constant line of pressure.

The above-mentioned solid-state processes produce high quality polymeric films with good mechanical properties, said films being particularly suitable for use in manufacturing antiballistic articles.

However, the present inventors noticed that all known solid-state processes for making polymeric films and in particular those mentioned above, produce films having a variable thickness along the production direction thereof. Moreover said films may also have a lateral thickness gradient, i.e. a thickness that varies from a smaller thickness at the extremities of said films to a larger thickness towards the center of said films. To the inventor's knowledge the presence of said thickness variation and gradient in the polymeric films were never noticed hitherto, the skilled person seemingly being unaware of such presence.

In most extreme cases variations higher than 50% in the thickness of the films from the center to the extremities thereof were observed. The inventors also observed that such thickness gradients always occur for polymeric films having a relatively large width. In this application a relatively large width means a width of more than 1000 mm, preferably more than 1250 mm, even preferably more than 1500 mm. Furthermore, the present inventors noticed than when polymeric films having a thickness gradient are further processed into various articles and in particular when tapes are produced from said film and subsequently used to manufacture various articles, said articles containing the tapes show a reduction in their performance. To inventors' knowledge this reduction in performance could have never been explained hitherto.

Therefore, an aim of the present invention may be to provide a process for the manufacturing of polymeric films, said process being affected to a lesser extent by the issues identified hereinabove. A further aim of the present invention may be to provide a polymeric film, preferably a wide polymeric film, having a reduced variation in thickness along its width and/or length.

The invention provides a process for the manufacturing of a polymeric film, preferably an UHMWPE film, comprising in sequence the steps of:

a. Providing a bed of polymeric powder, preferably UHMWPE powder;

b. Applying a compression pressure on said bed at a compression temperature below the melting temperature of the polymeric, preferably UHMWPE, powder to obtain a compressed bed;

c. Compacting the compressed bed in a smoothing unit comprising two compacting surfaces and a gap between said two compacting surfaces, at a compacting temperature below the melting temperature of the polymeric, preferably UHMWPE, powder to obtain a film, wherein said gap is substantially constant during the compacting step;

d. Optionally calendaring said film and/or (uniaxially) drawing said film.

It was observed that by using during the compacting step a smoothing unit utilizing a constant gap instead of using known calendars providing a constant line of pressure, a film may be obtained having optimum properties for further processing, e.g. calendaring, shaping and/or drawing.

FIGURE shows a comparison between the modus operandi of the known calendars and of the smoothing unit of the invention. In FIGURE, FIGURE a) and FIGURE b) show a front view of calendaring rolls (200); FIGURE c) shows a side view of calendaring rolls (200).

All calendars used in the relevant art of processing polymers and in particular UHMWPE powders work by providing a constant line of pressure on the compressed powder bed during compaction. With reference to FIGURE a) and FIGURE c), a constant line of pressure can be achieved by allowing for a deformation of the calendaring rolls (200) or by using a variable gap (102) that varies (107) with time (106) between a maximum value (102-4) and a minimum value (102-3). U.S. Pat. No. 4,364,158 acknowledges that in order to create a constant line of pressure on a compressed bed, bending of rolls in a calendar machine—as visualized in FIGURE a)—has been done for years. The common thinking in the art is therefore that one should use a constant line of pressure and that a non-constant line of pressure in the pressing gap of a calendar reduces the quality of the product produced thereof, i.e. the film, and can impair the productivity of the machines.

In stark contrast with the current teachings of the relevant art, the present invention revolves around setting the gap in the smoothing unit at a substantially constant value and therefore using a non-constant (or variable) line of pressure to compact the compressed bed, which in turn proved to produce for example an UHMWPE film having good characteristics, e.g. it may be for example easily further processed into a collection of UHMWPE tapes having fewer variations in properties between one another. With reference to FIGURE b), the calendaring rolls (200) that may be used in the inventive process are prevented—as detailed hereinafter—from deforming such as the rolls represented by the small-dotted lines in order to ensure for a substantially constant gap (102) between the surfaces (104) of said rolls.

Another difference between the inventive process and the known processes may be that the compaction step in the inventive process may provide a film having a substantially constant thickness and varying areal density rather than a film having substantially constant areal density and varying thickness as the known processes provide. Without being bound by any explanation, the inventors believe however that for achieving good properties it may be important to provide a film having a substantially constant thickness and that having a substantially constant areal density is less important.

Preferably at step c) of the inventive process, a compressed bed having a width and a thickness is compacted in the smoothing unit, wherein the gap is also substantially constant along the width of said compressed bed. It was observed that such an embodiment further optimizes the properties of the film.

In the inventive process, a bed of polymeric powder, preferably UHMWPE powder, is provided at step a). It was observed that optimal results were obtained for a bed having a width of at least 100 mm, more preferably at least 500 mm, most preferably at least 1000 mm. Preferably, said bed has a thickness of at most 60 mm, more preferably at most 20 mm, most preferably at most 10 mm. Preferably, said bed has a thickness of at least 0.3 mm, more preferably at least 0.9 mm, most preferably at least 2 mm. With the thickness of the bed is herein understood the average thickness of the powder bed as measured with a slide caliper.

Preferably, said bed of polymeric powder, preferably UHMWPE powder, has an areal density expressed in kg/m² of at least 0.1, more preferably of at least 0.5, most preferably of at least 0.8. Said areal density is preferably at most 10, most preferably at most 5, most preferably at most 1.5.

The polymer, preferably UHMWPE, is provided in the form of a powder comprising particles having sizes expressed as D50 of preferably at most 1000 micron, more preferably at most 500 micron, more preferably at most 300 micron. Said particles preferably have a size of at least 1 micron, more in particular at least 10 micron. The particle size distribution may be determined by laser diffraction (PSD, Sympatec Quixel) as follows. The sample of polymer is dispersed into surfactant-containing water and treated ultrasonic for 30 seconds to remove agglomerates/entanglements, or alternatively scattered in air and measured according to ISO 13320-1. In that test a sample of polymer powder is pumped through or contacted with a laser beam and the scattered light is detected. The amount of light diffraction is a measure for the particle size. Preferably, when UHMWPE powder is used, said powder has a bulk density as measured according to ASTM-D1895 of at most 0.6 g/cm³, more preferably at most 0.5 g/cm³, most preferably at most 0.25 g/cm³.

When UHMWPE is used as the polymer, said UHMWPE preferably has an intrinsic viscosity (IV) of at least 5 dl/g. Preferably the IV of said UHMWPE powder is at most 40 dl/g, more preferably at most 25 dl/g, more preferably at most 15 dl/g. Preferably, the UHMWPE has less than 1 side chain per 100 C atoms, more preferably less than 1 side chain per 300 C atoms. Suitable methods for manufacturing polyethylenes can be found for example in WO 2001/021668 and US 2006/0142521 included herein by reference. A particularly preferred UHMWPE powder is a powder of a highly disentangled UHMWPE obtainable according to a process using the conditions described in WO 2010/007062 pg. 17 and 18, included herein by reference.

At step b) of the inventive process, the powder bed is compressed at a compression temperature below its melting temperature to obtain a compressed bed. Preferably, said bed is compressed with a compression pressure of at least 2 bars, more preferably of at least 10 bars, even more preferably of at least 35 bars and most preferably of at least 50 bars. With the term melting temperature (Tm) of a polymeric powder is herein understood the temperature, measured according to ASTM D3418-97 by DSC using a heating rate of 20° C./min, falling in the melting range and showing the highest melting rate.

Various presses can be used to carry out the compression of the powder bed, e.g. isochoric or isobaric presses. A preferred isochoric or isobaric press is a double belt press, which is a press wherein the compression of said bed is carried out between two endless belts. It was observed however, that very good results were obtained when an isobaric press, and in particular a double belt isobaric press, was used for compression. By isobaric press is herein understood a press wherein the pressure applied to a bed of polymeric powder is independent by the thickness of said bed. This is in contrast with an isochoric press wherein the pressure applied to a bed of polymeric powder varies with the thickness of said bed. Isobaric presses are for example available from Hymmen GmbH (DE).

Preferably the width of the compressed bed is at least 10 mm, more preferably at least 100 mm, even more preferably at least 500 mm, most preferably at least 1000 mm. The thickness of the compressed bed is preferably at least 0.1 mm, more preferably at least 0.5 mm, most preferably at least 1 mm. Preferably the compressed bed has an average areal density of at least 0.7 g/cm³, more preferably of at least 0.9 g/cm³, most preferably of at least 0.92 g/cm³. Optimal results were obtained by using compressed beds having such characteristics. By average areal density is herein understood the average of the areal densities of at least ten randomly chosen samples. For accuracy, it is preferred that said randomly chosen samples have lateral dimensions of about 10% of the width of the compressed bed, e.g. in case the samples are square samples, their dimensions of width and length should be about 10% of the width of said compressed bed; and in case the samples are circular or round, their diameter or their largest dimension should be about 10% of the width of the compressed bed.

According to the invention, the compressed bed obtained at step b) of the inventive process is compacted in step c) in a gap between two compacting surfaces. Preferably the compacting surfaces are the surfaces of a pair of plates or of a pair of belts, more preferably of a pair of rotating rolls. When a pair of rolls is used to compact the compressed bed, said rolls are preferably counter-rotating preferably at the same speed. Preferably, said compacting surfaces are heated to a temperature below the melting temperature ($T_{m-bed}$) of the powder bed, preferably, the temperature ($T_s$) to which the compacted surfaces are heated fulfills the condition $T_{m-bed} > T_s > Tm-50°$ C., more preferably $T_{m-bed} > T_s > Tm-30°$ C., most preferably $T_{m-bed} > T_s > Tm-10°$ C.

Compaction may be achieved in the step c) of the inventive process by setting for example said gap smaller than the thickness of said compressed bed. When a pair of rolls is used, the gap may be understood as the smallest distance between the rotating surfaces of said rolls and the gap can be adjusted easily by adjusting the positioning of said rolls in respect to one another. Preferably the gap is chosen such that during the compaction step c) of the inventive process, a compaction force of at least 100 N/mm, more preferably of at least at least 200 N/mm, most preferably of at least at least 400 N/mm is applied on the compressed bed. To adjust the compaction force, the rolls may be provided with hydraulic cylinders to position the rolls, said force being easily adjusted by adjusting the hydraulic pressure in said cylinders. Preferably, the average areal density of the film is at least 0.9 g/cm³, more preferably at least 0.92 g/cm³, most preferably at least 0.94 g/cm³

It is essential for the invention that during the compaction step c) of the inventive process, the gap is kept substantially constant. With reference to FIGURE, a gap (101) can usually be defined by at least a gap-thickness dimension (102) and a gap-length dimension (103), wherein by gap-thickness (102) is herein understood the distance between the compacting surfaces (104) of the smoothing unit and by gap-length (103) is herein understood the dimension perpendicular to the plane defined by the gap-thickness (102) and the production direction (105). In the known calendars and with reference to FIGURE c), the gap-thickness (102) varies in time (106) during the calendaring process between a maximum gap-thickness (102-4) and a minimum gap-thickness (102-3). In accordance with the invention, by substantially constant gap during the compaction step c) is herein understood that the gap-thickness dimension has a variation ($\Delta_{compaction}$) during said step of at most 40%, more preferably at most 30%, most preferably at most 20%. Moreover, it is preferred that the gap is kept during said step c) also substantially constant along its length. In the known calendars and with reference to FIGURE a), the gap-thickness dimension (102) varies during the calendaring process along the gap-length dimension (103) between a maximum gap-thickness (102-1) and a minimum gap-thickness (102-2). It is therefore preferred that in the inventive process, the gap-thickness dimension (102) has also a variation ($\Delta_{length}$) along the gap-length dimension (103) of at most 50%, more preferably at most 25%, most preferably at most 10%. It is well known in the art how to compute the variation ($\Delta$) of a dimension, for example by using Formula 1:

$$\Delta=(Max-Min)/Avg \quad \text{Formula 1}$$

wherein Max is the maximum value of the dimension, Min is the minimum value of the dimension and Avg is the average value of the dimension.

It is known how to provide a constant gap between two compacting surfaces during the compaction step. For example when two rotating rolls are used, the gap between the rolls can be controlled by providing the rolls with actuators and a feedback mechanism controlling thereof or with hydraulic pistons, springs, and the like. Although known, such measures were to inventors' knowledge never used in processing UHMWPE powders and/or to produce UHMWPE films.

Preferably, the gap-length is at least 50 mm, more preferably at least 500 mm, most preferably at least 1000 mm. It was observed that the advantages of the invention were most conspicuous when using such large gap-lengths and in addition the productivity of the inventive process increased.

In a preferred embodiment of the inventive process, steps a) to c) are run continuously, i.e. each one of the steps a) to c) has an inset speed and an outset speed wherein the inset speed of a step is at least the same as the outset speed of the previous step and preferably the product of each step is not stored between the steps. Such an inventive process wherein steps a) to c) are run continuously is also referred to as a continuous process.

A gap that is substantially constant along its length may be achieved by various means. For example when using rotating rolls to compact the compressed bed, the inventors observed that the UHMWPE exerts a force on said rolls high enough to cause a bending of the rolls. In turn, the bending of the rolls may cause variations of said gap along its length. A means to fix the gap at substantially uniform dimensions is to use rolls having a variable diameter, e.g. a parabolic increase of diameter adapted to the compressed bed dimensions such as disclosed in Hensen, Knappe, Patente, *Plastic extrusion Technology II, Extrusion Machines*, Hanser-Verlag 1986. Alternatively, various other design features adopted to ensure uniform dimensions of the gap may include crossing of roll axes ("ax crossing") and counter-bending of rolls ("roll bending"). These methods were also to inventors' knowledge never used in processing UHMWPE powders and in particular in solid-state processing of UHMWPE powders into films, since no one was able to determine and explain hitherto said powder behavior during the compaction step of the solid-state processes. In this application a gap that is substantially constant, means that the difference in gap width of at most 40%, more preferably at most 30%, more preferably at most 20% and most preferably at most 10%.

In a preferred embodiment of the inventive process, step c) is carried out by using at least a pair of counter-rotating rolls, preferably having substantially the same diameter, wherein the rolls comprise a counter-bending device to compensate for the roll bending during their operation and ensure for a substantially parallel position of the rolls surfaces. The counter-bending device may be adjusted to correspond to the compaction force. Such a device is disclosed for example in U.S. Pat. No. 4,699,050; 5,236,640; 5,141,681; and DE-PS 17 29 821 included herein by reference. In one embodiment, the counter-bending device acts between outer end portions of the rolls such as disclosed in U.S. Pat. No. 5,048,411 included herein by reference.

In an alternatively preferred embodiment of the inventive process, step c) is carried out by using at least a pair of counter-rotating rolls, preferably having substantially the same diameter, wherein the rolls have a dimensional stiffness sufficient enough to prevent the bending of the rolls. Stiffening the rolls can be achieved for example by adjusting their dimensions, e.g. diameter, or by using materials having an optimal stiffness. Stiffened rolls are for example disclosed in U.S. Pat. No. 4,651,552 included herein by reference.

In a yet alternatively preferred embodiment of the inventive process, step c) is carried out by using at least a pair of counter-rotating rolls, preferably having substantially the same diameter, wherein the rolls are provided with means permitting an oblique positioning of the rolls and wherein the rolls are preferably further provided with a counter bending device. Such an apparatus is disclosed for example in U.S. Pat. No. 3,993,424 included herein by reference.

In a yet alternatively preferred embodiment of the inventive process, step c) is carried out by using at least a pair of counter-rotating rolls, preferably having substantially the same diameter, wherein at least one of the rolls, preferably both rolls, is/are crowned to compensate for the bending of the rolls. The amount of crown given to the rolls is that which will presumably bring about a substantially parallel arrangement of the rolls surfaces during their operation. Since, the crown with which the rolls need to be provided depend upon their operating conditions, for optimum results may be necessary to provide rolls with different crowns under said different operating conditions. Crowning of the rolls is for example disclosed in U.S. Pat. No. 2,965,920 included herein by reference. U.S. Pat. No. 2,965,920 also discloses arranging the rolls axes in a non-parallel relation to effect what is commonly termed as a cross-axis relationship.

The invention also relates to a polymeric, preferably UHMWPE, film or tape. Preferably said film is obtained with the process of the invention. It was observed that the inventive film had a lower thickness variation as measured at randomly chosen locations on said film. The thickness variation is herein understood the average of at least 10 thickness measurements carried out at randomly chosen locations. In particular it was surprisingly observed that a coefficient of variation of the thickness of the film of the invention was obtained of at most 6%, more preferably at most 4%, even more preferably at most 2%, yet more preferably at most 1%, most preferably at most 0.9%. As far as known to the inventors such wide films of a width of at least 1000 mm, preferably 1250 mm, more preferably 1500 mm, made by a solid state process with such low coefficient of variation of the thickness of the film were never produced so far. Preferably such films or tapes are made of UHMWPE. The invention therefore also related to a polymeric, preferably UHMWPE, film or tape of a width of at least 1000 mm, preferably 1250 mm, more preferably 1500 mm, said film having a coefficient of variation of the thickness of at most 6%, more preferably at most 4%, even more preferably at most 2%, yet more preferably at most 1%, most preferably at most 0.9%.

Since the inventive film is obtained by the solid-state process of the invention, it is also referred to herein as solid-state film.

The inventive solid-state films may be further drawn and/or calendared in the inventive process. It was observed however that high quality inventive solid-state films may be obtained even in the absence of the further calendaring step.

The inventive process may further comprise a cutting step wherein the inventive solid-state film is cut or split into a plurality of slitted solid-state tapes. The slitted solid-state tapes are referred to herein simply as solid-state tapes. Although called tapes, it is to be understood that the terms film and tape are interchangeable. It was observed that a plurality of solid-state tapes having fewer thickness variations not only along their own length but also between themselves may be obtained. This achievement was surprising as none of the known solid-state processes is able to manufacture solid-state tapes having a substantially constant thickness and even less a plurality of solid-state tapes having fewer thickness variations between the tapes.

By tape is herein understood an elongated body having a length dimension, a width dimension and a thickness dimension, wherein the length dimension of the tape is greater than its width dimension, and wherein said length dimension is much greater than its thickness dimension. Preferably, the tape has a width of between 20 mm and 2000 mm, more preferably between 50 mm and 1500 mm, most preferably between 80 mm and 1200 mm. Said tape preferably has an average thickness of between 5 μm and 400 μm, more preferably between 7.5 μm and 350 μm, most preferably between 10 μm and 300 μm. Preferably, said tape has a width (W) to average thickness (T) ratio (W/T) of at most 40.000, more preferably at most 30.000, most preferably at most 25.000.

The invention therefore further relates to a plurality of solid-state tapes, each solid-state tape having an average thickness (T), wherein said plurality of solid-state tapes is characterized by a coefficient of variation in thickness between said tapes, hereafter $CV_{thickness}$, of less than 50%, wherein $CV_{thickness}$ is determined from Formula 2 by using average thickness values of a number of 5 representative tape lengths, wherein each of said tape lengths corresponds to a different randomly chosen tape extracted from said plurality of tapes $$CV_{THICKNESS} = \sqrt{\frac{\sum_{i=1}^{n}(x_i - \bar{x})^2}{n-1}} \times \frac{1}{\bar{x}} \times 100 \qquad \text{Formula 2}$$

wherein $x_i$ is the average thickness of any one of said representative tape lengths and $\bar{x}$ is the averaged value over the n=5 measured average thicknesses. By average thickness of a representative tape length is herein understood the average of at least 10 thickness measurements carried out at randomly chosen locations on said tape length.

Preferably, $CV_{thickness}$ is less than 40%, more preferably less than 30%, even more preferably less than 20%, yet even more preferably less than 10%, most preferably less than 5%. More preferably, $CV_{thickness}$ is less than 40%, more preferably less than 30%, even more preferably less than 20%, yet even more preferably less than 10%, most preferably less than 5% for a tape width of at least 1000 mm. Even more preferably $CV_{thickness}$ is less than 20% for a tape width of at least 1250 mm. Most preferably $CV_{thickness}$ is less than 20% for a tape width of at least 1500 mm.

The invention also relates to a sheet comprising the plurality of solid-state tapes of the invention. Preferably, the solid-state tapes are arranged in the sheet in a unidirectional manner, i.e. said tapes are arranged to run along their length in a substantially parallel manner. Such a sheet is also referred to in the art as unidirectional sheet. Every two adjacent tapes in a unidirectional sheet may be positioned such that they partially overlap or abut each other or a gap may exist between said tapes or a combination of the above. The unidirectional sheets may be stacked and adhered together by e.g. compressing, to form an assembled sheet. In an assembled sheet the tape direction preferably in each adjacent sheet differs. Preferably the tape direction in adjacent layers in adjacent layers is at an angle of 90°.

In a preferred embodiment, the sheet of the invention is a woven sheet, preferably a plain-woven sheet.

The invention further relates to a panel comprising a plurality of the inventive sheets and articles comprising said panel. In a preferred embodiment, said panel is a consolidated panel, preferably compressed under pressure and temperature. Preferably, the panel of the invention is compressed at a temperature of below the melting temperature ($T_m$) of the tapes, more preferably at a temperature of between said $T_m$ and $T_m-30°$ C. and with a pressure of at least 10 bars, more preferably at least 50 bars, most preferably at least 100 bars to obtain a rigid panel. Thickness of such a panel may be at least 4 mm, preferably at least 10 mm, more preferably at least 15 mm. Typically such thickness does not exceed 100 mm.

The invention further relates to an armor comprising the panel of the invention. Examples of armors include but are not limited to helmets, breastplates, vehicle hulls and vehicle doors.

The present invention further relates to a product for automotive applications (car parts, etc.), marine applications (ships, boats, panels, etc.), aerospace applications (planes, helicopters, panels, etc.), defense/life-protection applications (ballistic protection, body armor, ballistic vests, shields, ballistic helmets, ballistic vehicle protection, etc.), or architectural applications (windows, doors, (pseudo-) walls, cargo doors, cargo walls, radomes, shields, etc.), wherein said product contains the tapes, plurality of tapes, sheets and/or the panel of the invention.

The invention will be further explained with the help of the following examples without however being limited thereto.

Methods of Measuring

Flexural strength of a panel is measured according to ASTM D790-07. To adapt for various thicknesses of the panel, measurements are performed according to paragraph 7.3 of ASTM D790-07 by adopting a loading and a support nose radius which are twice the thickness of the article and a span-to-depth ratio of 32.

Areal density (AD) was determined by measuring the weight of a sample of preferably 0.4 m×0.4 m with an error of 0.1 g.

Intrinsic Viscosity (IV) for polyethylene is determined according to ASTM D1601 at 135° C. in decalin, the dissolution time being 16 hours, with DBPC as anti-oxidant in an amount of 2 g/l solution, by extrapolating the viscosity as measured at different concentrations to zero concentration.

Side chains in a polyethylene or UHMWPE sample is determined by FTIR on a 2 mm thick compression molded film by quantifying the absorption at 1375 cm-1 using a calibration curve based on NMR measurements (as in e.g. EP 0 269 151).

The melting temperature (also referred to as melting point) of a tape is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

The furnace block of the DSC-7 is cooled with water, with a temperature of 4° C. This is done to provide a constant block temperature, resulting in more stable baselines and better sample temperature stability. The temperature of the furnace block should be stable for at least one hour before the start of the first analysis.

The tape sample is cut into small pieces of 5 mm maximum width and length to achieve a sample weight of at least about 1 mg (+/−0.1 mg).

The sample is put into an aluminum DSC sample pan (50 μl), which is covered with an aluminum lid (round side up) and then sealed. In the sample pan (or in the lid) a small hole must be perforated to avoid pressure build-up (leading to pan deformation and therefore worse thermal contact).

This sample pan is placed in a calibrated DSC-7 instrument. In the reference furnace an empty sample pan (covered with lid and sealed) is placed.

The following temperature program is run:
5 min. 40° C. (stabilization period)
40 up to 200° C. with 10° C./min. (first heating curve)
5 min. 200° C.
200 down to 40° C. (cooling curve)
5 min. 40° C.
40 up to 200° C. with 10° C./min. (second heating curve)

The same temperature program is run with an empty pan in the sample side of the DSC furnace (empty pan measurement).

Analysis of the first heating curve is used. The empty pan measurement is subtracted from the sample curve to correct for baseline curvature. Correction of the slope of the sample curve is performed by aligning the baseline at the flat part before and after the peaks (e.g. at 60 and 190° C. for UHMWPE). The peak height is the distance from the baseline to the top of the peak. For example in the case of UHMWPE, two endothermic peaks are expected for the first heating curve, in which case the peak heights of the two peaks are measured and the ratio of the peak heights determined.

For the calculation of the enthalpy of an endothermic peak transition prior to the main melting peak, the following procedure may be used. It is assumed that the endothermic effect is superimposed on the main melting peak. The sigmoidal baseline is chosen to follow the curve of the main melting peak, the baseline is calculated by the PerkinElmer Pyris™ software by drawing tangents from the left and right limits of the peak transition. The calculated enthalpy is the peak area between the small endothermic peak transition and the sigmoidal baseline. To correlate the enthalpy to a weight %, a calibration curve may be used.

The coefficient of variation of the thickness of a film was calculated from individual thickness measurements carried out at 200 randomly chosen locations on a film having a length of 100 meters and a width of 50 cm.

Back face deformation of a panel was tested according to NIJ 0101.04 level IIIA using 20 mm FSP on an internal shooting template.

Ballistic performance of a panel was measured by subjecting the panel to shooting tests performed with standard (STANAG) 17 grain FSP and 9 mm Parabellum. The first shot was fired at a projectile speed (V50) at which it is anticipated that 50% of the shots would be stopped. The actual bullet speed was measured at a short distance before impact. If a stop was obtained, the next shot was fired at an anticipated speed being 5% or 10% higher than the previous speed. If a perforation occurred, the next shot was fired at a speed 5% or 10% lower than the previous speed. The result for the experimentally obtained V50 value was the average of the two highest stops and the two lowest perforations within a range of 40 m/s. The kinetic energy of the bullet at V50 was divided by the total areal density of the panel to obtain a so-called Eabs value. Eabs reflects the stopping power of the panel relative to its weight/thickness thereof. The higher the Eabs the better the panel is.

The speed of the projectile was measured with a pair of Drello Infrared (IR) light screen Type LS19i3 positioned perpendicular on the path of the projectile. At the instant when a projectile passes through the first light screen a first electric pulse will be produced due to the disturbance of the IR beam. A second electric pulse will be produced when the projectile passes through the second light screen. Recording the moments in time when the first and the second electric pulses occur, and knowing the distance between the light screed the speed of the projectile can be immediately determined.

EXPERIMENTAL RESULTS

Comparative Experiment A

An UHMWPE powder was processed in accordance with Example 2 of EP 1 627 719. In particular an UHMWPE having an weight average molecular weight (Mw) of between 4 and 5 million, intrinsic viscosity of about 26 dl/g, an average particle size of 275 μm and a bulk density of about 0.43-0.47 g/cm$^3$, the polymer being drawable in the solid state was formed into a powder bed of thickness of about 2.2 mm. The powder bed was subjected to compression in a double belt isochoric press at a temperature of 135° C. and a pressure of about 0.0025 GPa, the press being purchased from Hymmen, Del. After compression, a compressed bed was obtained having an average thickness of about 1.0 mm.

The compressed bed was compacted with a known calendar having a pair of counter-rotating rollers (or rolls) each dimensioned to be 300 mm in diameter and 800 mm in crosswise length and having the same peripheral speeds.

No measures were taken to ensure a constant gap of the calendar.

After compaction a film was obtained having an average thickness of about 242 microns and a coefficient of variation of its thickness of about 7%.

Example 1

The COMPARATIVE EXPERIMENT A was repeated, however, in place of the calendar a smoothing unit was utilized for compaction of the compressed film. The smoothing unit had two counter-rotating rollers provided with positioning pistons. The gap between the rollers was maintained constant during the functioning of the smoothing unit with the help of a feedback mechanism which controlled the positioning pistons.

The compressed bed was compacted in the smoothing unit at a pressure of about 400 N/mm and at a temperature of about 139° C. The obtained film had an average thickness of about 265 microns and a coefficient of variation of its thickness of about 0.85%

From the above results it can be clearly seen that the process of the invention produces films having less thickness variations than the films produced by the known processes.

Comparative Experiment B

Comparative experiment A was repeated whereby the compressed bed was 1500 mm wide and was compacted with a known calendar, the rollers now having a dimension of 1500 mm in crosswise length.

The resulting film had a thickness of 400 micron and the coefficient of variation of its thickness was more than 3.5%.

Example 2

Comparative experiment B was repeated whereby a counter bending force of 150 kN was applied through hydraulic cylinders at both outer ends of the axis of one roll to ensure a constant gap between both rolls. The film had a thickness of 30 micron at a width of 1500 mm. The coefficient of variation of its thickness was 0.7%.

The invention claimed is:

1. A process for the manufacturing of an ultrahigh molecular weight polyethylene (UHMWPE) film, comprising in sequence the steps of:
   (a) providing a bed of UHMWPE powder;
   (b) applying a compression pressure on the bed of UHMWPE powder at a compression temperature below a melting temperature of the UHMWPE powder to obtain a compressed bed;
   (c) forming a film by compacting the compressed bed in a smoothing unit comprising two compacting surfaces providing a non-constant line of pressure and a gap having a gap-thickness dimension and a gap length dimension between the two compacting surfaces, at a compacting temperature below the melting temperature of the UHMWPE powder, the non-constant line of pressure being achieved by establishing a substantially constant gap-thickness dimension which has a variation over time between a minimum gap thickness and a maximum gap-thickness ($\Delta_{compaction}$) of at most 20%, and wherein the film formed by step (c) exhibits a reduced variation in thickness along its width and/or length as determined by a plurality of tapes slit from the film each having an average thickness (T) such that a plurality of the tapes has a coefficient of variation in thickness ($CV_{thickness}$) of less than 2% as determined by the following formula using the average thickness (T) of a number of five representative tape lengths each corresponding to a different randomly chosen tape from the plurality of tapes slit from the film:

$$CV_{THICKNESS} = \sqrt{\frac{\sum_{i=1}^{n}(x_i - \bar{x})^2}{n-1}} \times \frac{1}{\bar{x}} \times 100,$$

wherein
   $x_i$ is the average thickness of any one of the representative tape lengths and $\bar{x}$ is the averaged value over the n=5 measured average thicknesses, where each measured average thickness is an average of at least 10 thickness measurements carried out at randomly chosen locations of the representative tape lengths.

2. The process of claim 1, further comprising a step of:
   (d) calendaring the film obtained at step (c) and/or uniaxially drawing the film.

3. The process of claim 1, wherein the bed of the UHMWPE powder has a width of at least 100 mm.

4. The process of claim 1, wherein the bed of the UHMWPE powder has a thickness of at least 0.3 mm.

5. The process of claim 1, wherein the UHMWPE powder comprises particles having D50 sizes of at most 1000 micron.

6. The process of claim 1 wherein the compressed bed has a width of at least 100 mm.

7. The process of claim 1, wherein the gap-length dimension has a variation ($\Delta_{length}$) of at most 10%.

8. The process of claim 1, wherein step (c) comprises a smoothing unit having two rotating rolls respectively comprising the two compacting surfaces, wherein the gap between the two compacting surface of the rolls is controlled by providing the rolls with actuators and a feedback mechanism controlling the actuators.

* * * * *